United States Patent
Wood et al.

(10) Patent No.: US 7,882,311 B2
(45) Date of Patent: Feb. 1, 2011

(54) NON-SNOOP READ/WRITE OPERATIONS IN A SYSTEM SUPPORTING SNOOPING

(75) Inventors: Aimee D Wood, Tigard, OR (US); Robert J. Safranek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/704,284

(22) Filed: Feb. 11, 2010

(65) Prior Publication Data

US 2010/0146200 A1 Jun. 10, 2010

Related U.S. Application Data

(63) Continuation of application No. 11/852,875, filed on Sep. 10, 2007, now Pat. No. 7,707,364.

(51) Int. Cl.
  *G06F 12/00* (2006.01)
(52) U.S. Cl. .................. 711/151; 711/141; 711/158
(58) Field of Classification Search .................. 711/151, 711/141, 158
  See application file for complete search history.

(56) References Cited

U.S. PATENT DOCUMENTS

| | | | |
|---|---|---|---|
| 5,463,753 A | 10/1995 | Fry et al. | |
| 5,813,035 A | 9/1998 | McCoy et al. | |
| 7,299,324 B2 | 11/2007 | Shrader et al. | |
| 7,523,327 B2 | 4/2009 | Cline et al. | |
| 7,574,520 B1 | 8/2009 | Basu et al. | |
| 2003/0236961 A1* | 12/2003 | Qiu et al. | 711/170 |
| 2005/0204088 A1 | 9/2005 | Ho et al. | |

* cited by examiner

*Primary Examiner*—Stephen C Elmore
(74) *Attorney, Agent, or Firm*—Blakely, Sokoloff, Taylor & Zafman LLP

(57) ABSTRACT

Techniques that may utilize generic tracker structures to provide data coherency in a multi-node system that supports non-snoop read and write operations. The trackers may be organized as a two-dimensional queue structure that may be utilized to resolve conflicting read and/or write operations. Multiple queues having differing associated priorities may be utilized.

19 Claims, 5 Drawing Sheets

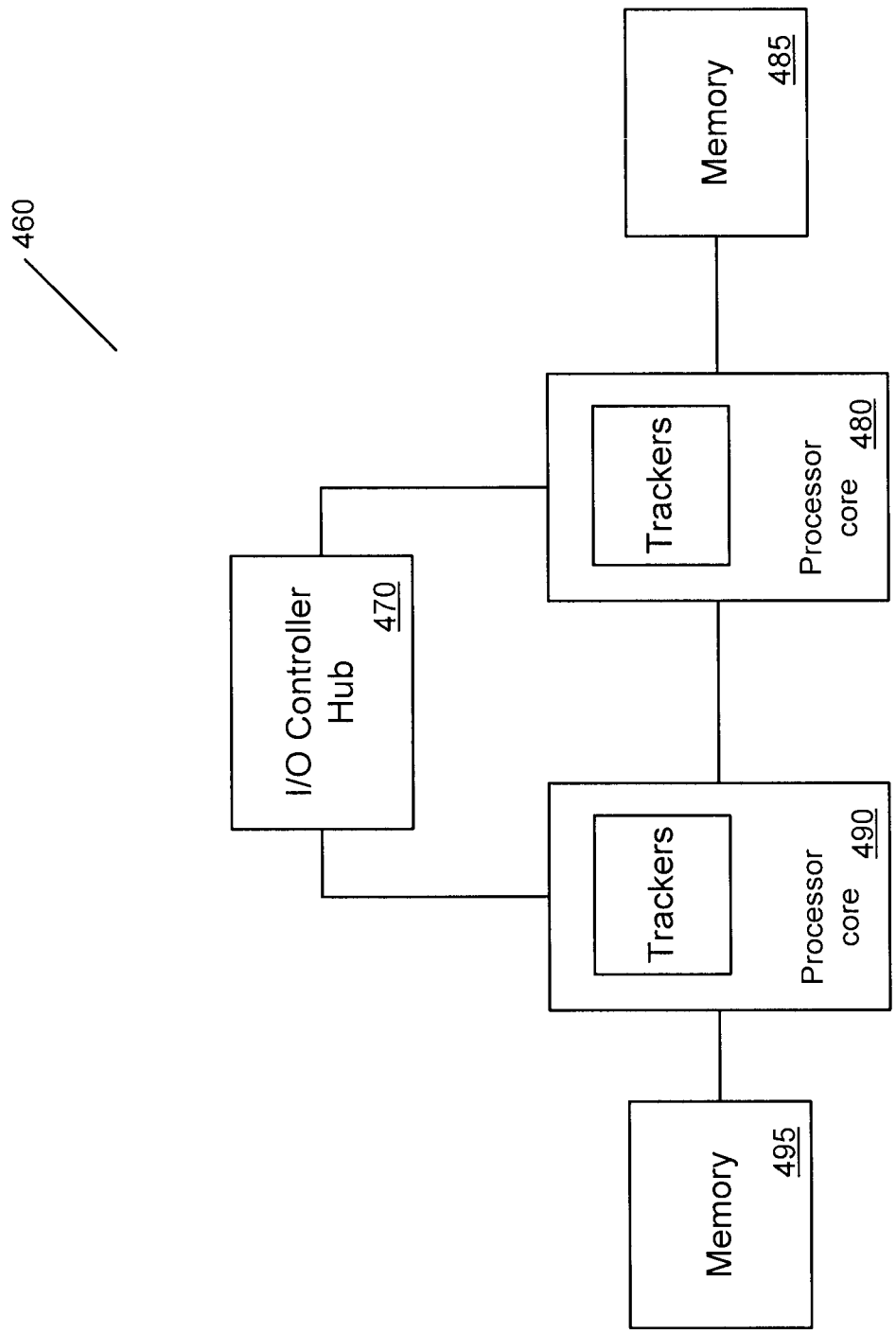

US 7,882,311 B2

NON-SNOOP READ/WRITE OPERATIONS IN A SYSTEM SUPPORTING SNOOPING

This application is a continuation of and claims priority to U.S. application Ser. No. 11/852,875, now U.S. Pat. No. 7,707,364 filed Sep. 10, 2007, entitled, NON-SNOOP READ/WRITE OPERATIONS IN A SYSTEM SUPPORTING SNOOPING.

TECHNICAL FIELD

Embodiments of the invention relate to techniques for processing read and/or write operations in an electronic system. More particularly, embodiments of the invention relate to techniques and structures for organizing and processing read and/or write operations that may conflict with pending read and/or write operations.

BACKGROUND

As processing systems become more complex, the number of conflicts between operations may increase. For example, a write operation may be issued to cause data to be written to a particular memory location. Before the data is written to memory, a read operation may be issued to read the data from the memory location. Until the write operation is completed, there exists a conflict between the write operation and the read operation.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4c is a block diagram of one embodiment of electronic system having an I/O controller hub coupled with two processor cores each having a memory that may use a point-to-point interface in which one or more trackers may be used.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein is a technique that may utilize generic tracker structures to provide data coherency in a multi-node system that supports non-snoop read and write operations. Conceptually, these trackers may be organized as a two-dimensional queue structure that may be utilized to resolve conflicting read and/or write operations. The trackers may be utilized in processing both non-snoop and snoop operations. In one embodiment, multiple queues having differing associated priorities may be utilized.

Figure 1:
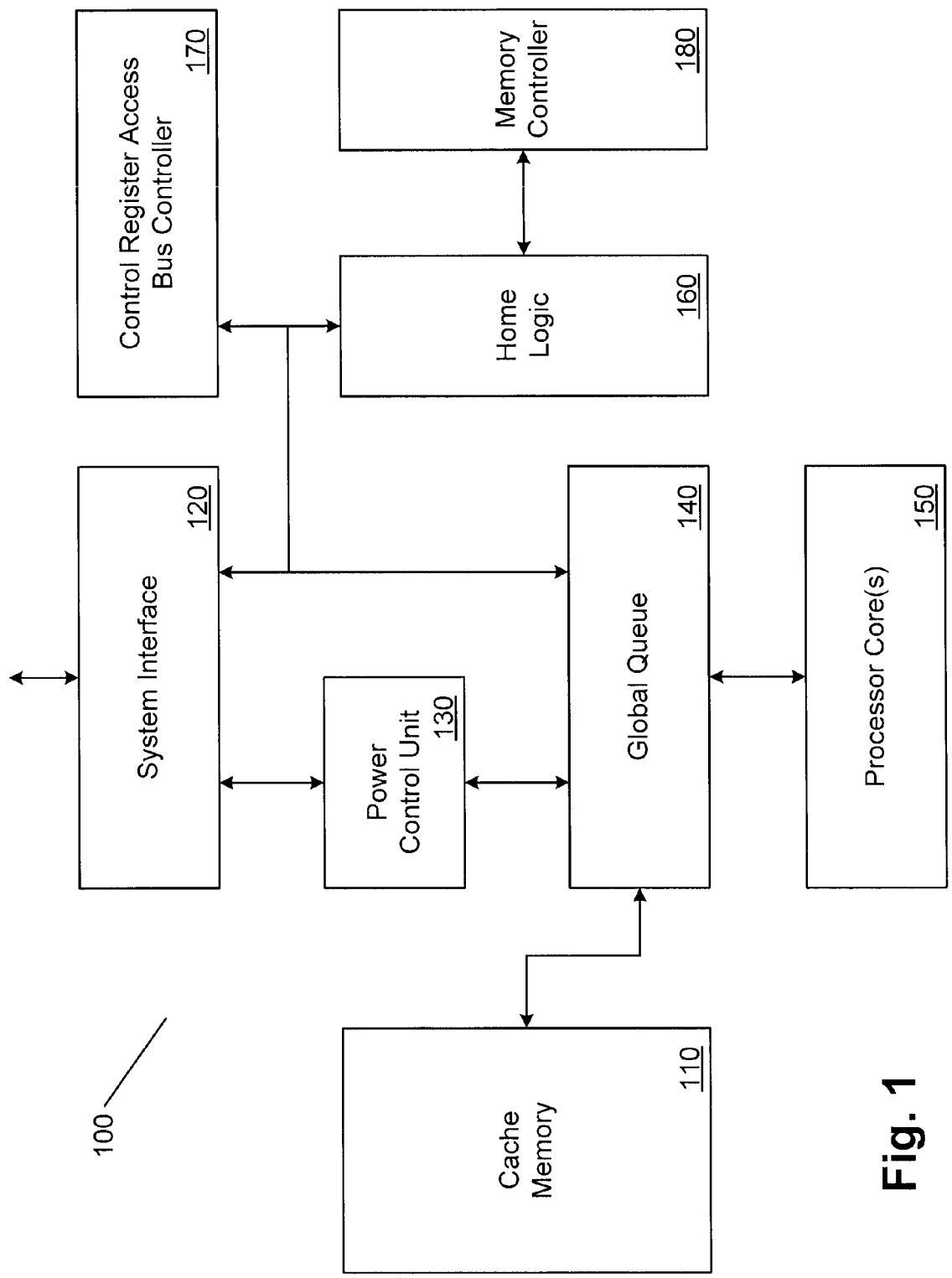
FIG. 1 is a block diagram of one embodiment of an electronic system having trackers.

FIG. 1 is a block diagram of one embodiment of an electronic system having trackers. Electronic system 100 is intended to represent a broad variety of electronic systems. Several example configurations are described in greater detail below.

Electronic system 100 may include processor core(s) 150, which may represent one or more processor cores. In general, a processor core is a portion of an integrated circuit that provides processing functionality. Processor core(s) 150 may be coupled with global queue 140 that may function to stage data passing to and from processor core(s) 150.

In one embodiment, global queue 140 may be coupled with cache memory 110, which may be any type of cache memory. In one embodiment, cache memory 110 is a last level (or highest level) cache memory. Lower level cache memories may be included, for example, within one or more of processor core(s) 150 and/or coupled with one or more of processor core(s) 150 (not illustrated in FIG. 1).

In one embodiment, global queue 140 may be coupled with power control unit 130 and with system interface 120. Power control unit 130 may provide power control functionality and is not required to implement the trackers. System interface 120 may provide an interface between an integrated circuit package having the components of electronic system 100 and external devices (not illustrated in FIG. 1).

In one embodiment, system interface 120 may include physical layer and link layer functionality that may allow electrical signals to be received via system interface 120 to be processed by components of electronic system 100. For example, system interface 120 may be a serial point-to-point interface. In one embodiment, system interface 120 and global queue 140 may be coupled with control register access bus controller 170 and home logic 160. In one embodiment home logic 160 (described in greater detail with respect to FIG. 2) may include the trackers and other control logic. Home logic 160 may be coupled with memory controller 180, which may be coupled with memory devices (not illustrated in FIG. 1).

Various coherency strategies and data management techniques have been developed to ensure data validity in multiprocessor or multi-data source systems. In various embodiments described herein non-snoop read and non-snoop write commands may cause all requests to memory to be in a single message class targeted to a single home node in a multi-node system. This may eliminate the need for certain components of the home node to not process input/output commands and/or control register traffic, which can improve performance of the home node.

As used herein trackers refer to any type of storage element that may be used for ordering of memory requests. For example, home logic 160 may include a set of registers (e.g., 24 registers, 48 registers, 32 registers) that may be available for use for any purpose within home logic 160. The trackers may be any type of memory element. As described in greater detail below, the trackers may be logically organized as a two-dimensional dynamic queue or as multiple first in, first out (FIFO) queues having different associated priorities.

In one embodiment, the trackers may be utilized to resolve conflicting memory requests (e.g., non-snoop reads and non-snoop writes). Other transactions may be completed out of order. In one embodiment, the trackers may be utilized to resolve conflicts between read and write operations that have been posted to home logic 160 by selectively stalling servicing of requests from a queue in favor of a lower priority queue in order to resolve a conflict. When the conflict is resolved the previously conflicted request from the higher priority queue may be serviced.

Figure 2:
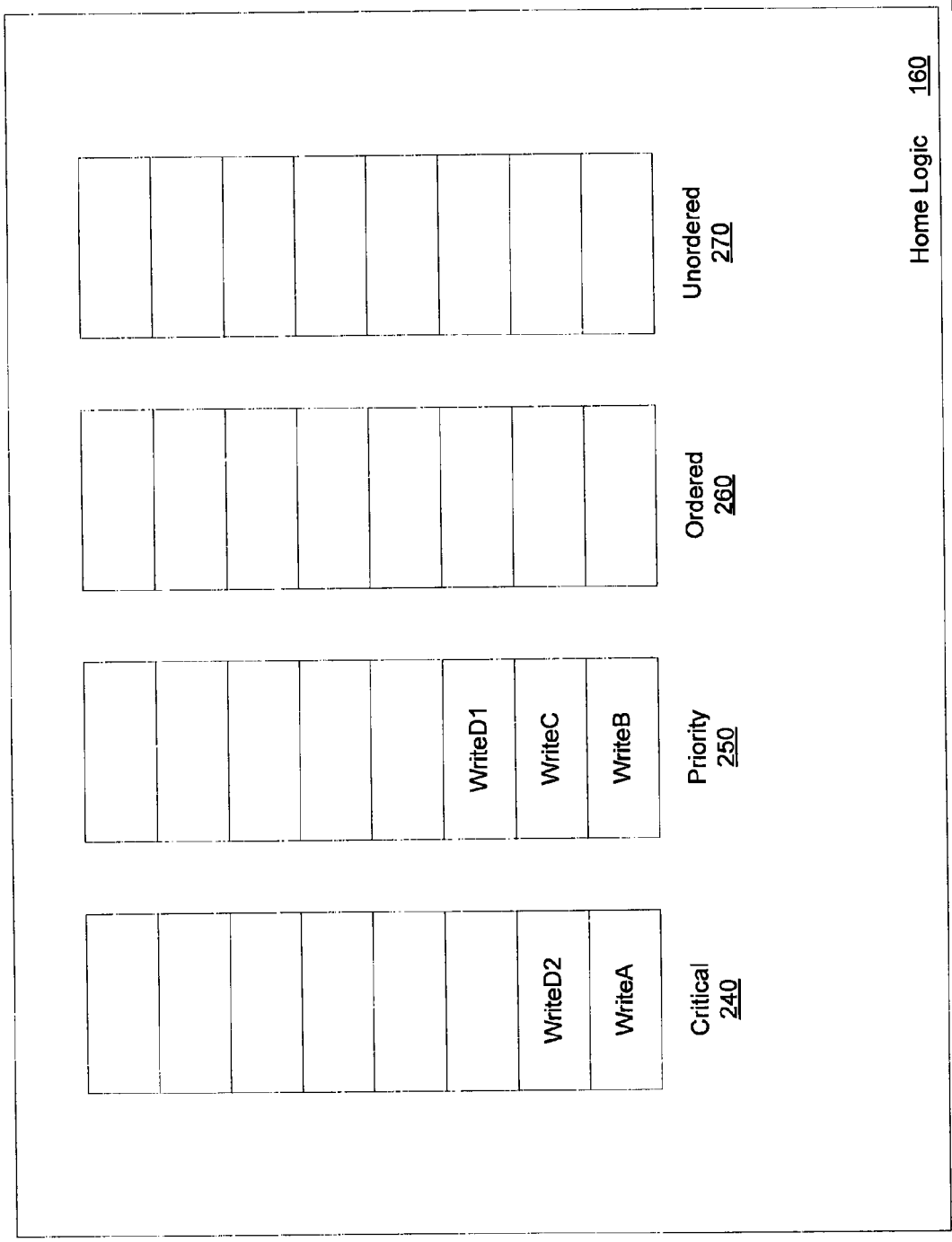
FIG. 2 is a block diagram of a home logic having multiple general-purpose trackers.

FIG. 2 is a block diagram of a home logic having multiple general-purpose trackers. In the example of FIG. 2, four queues of eight trackers each provide an example logical configuration. The number of trackers in each queue is not required to be the same and one or more trackers may be used by home logic 160 for other purposes.

In the following example, several non-snoop write operations (labeled "WriteA," "WriteB," "WriteC," "WriteD1" and "WriteD2") may be received by home logic 160 where the alphabetic suffix corresponds to the memory location of the write operations are received. When the write operations are received by home logic 160, they may be posted to one of the tracker queues (Critical 240, Priority 250, Ordered 260 and Unordered 270).

If a non-snoop read operation is received before all write operations corresponding to the address of the read operation are serviced an address conflict exists. Because the memory operations are non-snoop operations, the most current data is only available from the operations that have been posted to home logic 160. As described in the example that follows, the queues formed from the trackers may be utilized to resolve the conflict by selectively servicing the requests stored in the queues.

The WriteA operation may be received by home logic 160 and placed in Critical queue 240. Similarly, the WriteB operation may be received by home logic 160 and placed in Priority queue 250. The queue assignments may be based on any type of priority scheme. The priorities may be based on, for example, the source of the memory request, a length of time that the request has been pending, the number of requests previously received, and/or any other relevant factors.

The WriteC operation may be received by home logic 160 and placed in Priority queue 250. The WriteD1 operation may be received by home logic 160 and placed in Priority queue 250. The WriteD2 operation may be received by home logic 160 and placed in Critical queue 240. In the example of FIG. 2, the WriteD1 operation and the WriteD2 operation cause data to be written to the same location in memory (designated by the "D" suffix), but are received at different times (designated by the numeric suffix).

If a ReadD operation is received by home logic 160 prior to servicing of both the WriteD1 and the WriteD2 operations, a conflict exists. That is, if the ReadD operation is serviced before the WriteD1 and WriteD2 operations are services, the ReadD operation will return invalid/incorrect data. As a further complication, the WriteD1 and WriteD2 operations must be performed in the correct order in order to allow the ReadD operation to return the correct data.

In one embodiment, when no conflict exists, entries from Critical queue 240 are processed until Critical queue 240 is empty. When Critical queue 240 is empty entries from Priority queue 250 are processed. Similarly, when both Critical queue 240 and Priority queue 250 are empty entries from Ordered queue 260 are processed. This servicing technique may be utilized to support any number of queues. The example of FIG. 2 includes only four queues for reasons of simplicity, but the number of queues used may be selected based on, for example, the number of trackers available, the number of processing nodes in the system, and/or any other relevant factors. In one embodiment, the number of trackers available my dynamically change based on, for example, other uses of the trackers in the system.

When a conflict is detected, processing of a higher priority queue may be stalled in favor of a lower priority queue until the conflict is resolved. Returning to the example above, when the ReadD operation is received and the conflict detected processing of Critical queue 240 may be stalled in favor of Priority queue 250, which includes the WriteD1 operation. That is, the WriteB, WriteC and WriteD1 operations may be processed while Critical queue 240 is stalled.

After the WriteD1 operation is serviced, the processing of Critical queue 240 may be resumed in order to service the WriteD2 operation. That is, the WriteA and WriteD2 operations may be processed from Critical queue 240. After the WriteD1 and WriteD2 operations have been serviced, the conflict has been resolved and the ReadD operation may be serviced. This process of conflict resolution may allow the ReadD operation to return correct data. Because the Read and Write operations are non-snooped operations, the only source of correct data in home logic 160 is the ordered processing of the non-snoop Read and Write operations.

While the example of FIG. 2 includes only one conflict, any number of conflicts may be resolved in a similar manner. For example, if two conflicts exist, the conflict that would be resolved more quickly may be given priority over the second conflict, or the conflict that is received first in time may be given priority over the second conflict.

Figure 3:
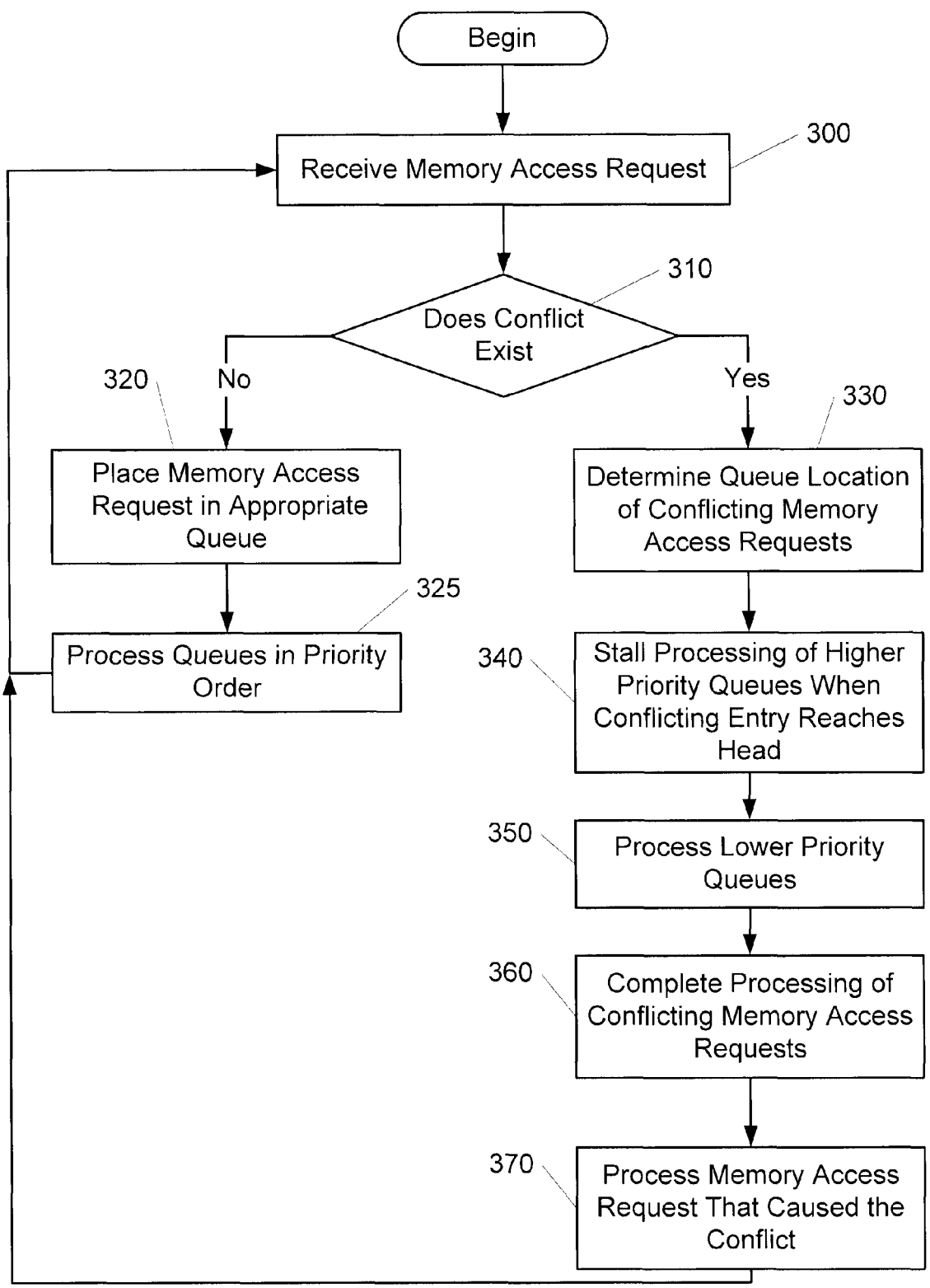
FIG. 3 is a flow diagram of one embodiment of a technique to resolve conflicts between non-snoop read/write operations.

FIG. 3 is a flow diagram of one embodiment of a technique to resolve conflicts between non-snoop read/write operations. A memory access request may be received, 300. The memory access request may be either a non-snoop read request or a non-snoop write request. The memory access request may have an associated priority (e.g., Critical, Priority, Ordered, Unordered), or a priority may be assigned to the memory access request by the receiving circuitry (e.g., home logic 160).

The receiving circuitry may determine whether a conflict exists with the newly received memory access request, 310. A conflict may be detected, for example, by comparing the address associated with the memory access request with addresses associated with other memory access request that have been posted, but no serviced. If the newly received memory access request and a posted memory access request have the same target address a conflict may exist.

If a conflict does not exist, 310, the memory access request may be posted to an appropriate queue, 320. If no conflict exists, the queues are processed based on priority as described above, 325. In one embodiment, a highest priority queue is processed, if any entries exist, before lower priority queues are processed.

If a conflict does exist, 310, a queue location of the conflicting memory access operation may be determined, 330. In one embodiment the conflicting entry may be marked as corresponding to a conflict. If the conflicting memory access operation reaches the head of a queue and higher priority queues are not empty, processing of the higher priority queues may be stalled, 340. Processing of lower priority queues may be accomplished, 350, while the higher priority queues are stalled, 350.

In one embodiment, a separate queue that orders requests per address may be used. If an entry reaches the top of the critical queue but is not at the top of the corresponding address conflict queue, then the critical queue may be stalled until the entry also reaches the head of the conflict queue. While the critical queue is stalled, the priority and other queues may be processed and eventually the address conflict queue will be updated.

This may continue until processing of the conflicting memory access request has been accomplished, 360. When the conflicting memory access requests have been processed the original memory access request may be processed, 370.

Figure 4A:
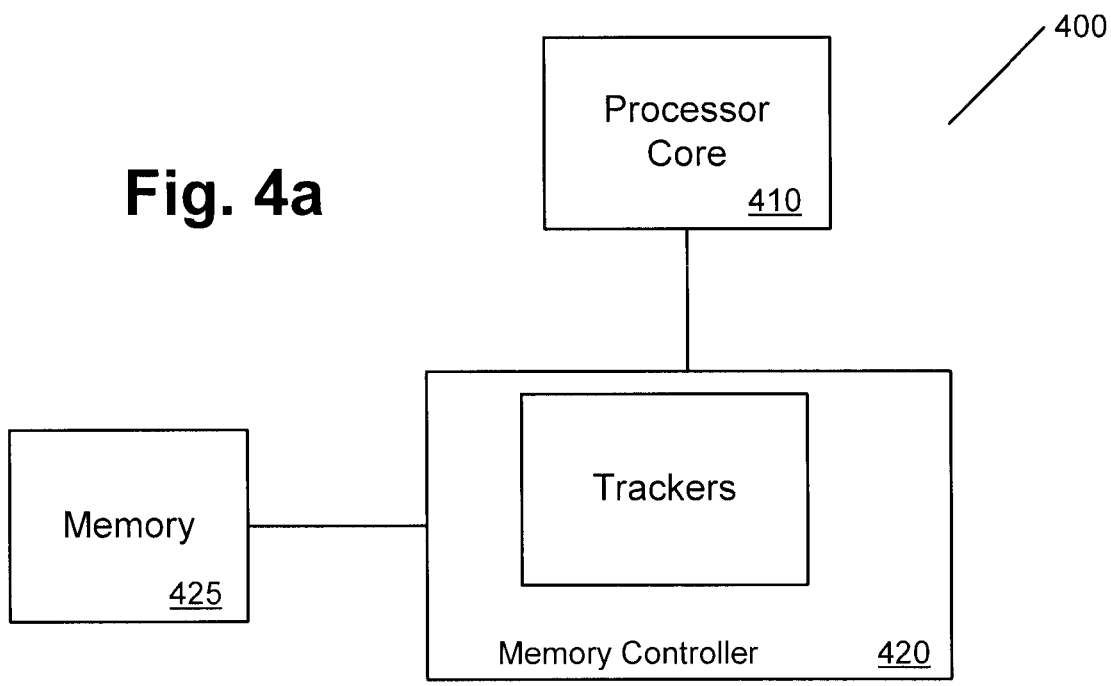
FIG. 4a is a block diagram of one embodiment of electronic system having a processor core, a memory controller and a memory that may use a point-to-point interface in which one or more trackers may be used.

FIG. 4a is a block diagram of one embodiment of electronic system having a processor core, a memory controller and a memory that may use a point-to-point interface in which one or more trackers may be used. Additional components not illustrated in FIG. 4a may also be supported.

Electronic system 400 may include processor core 410 and memory controller 420 that are coupled together with a point-to-point interface as described above. Memory controller 420 may also be coupled with memory 425, which may be any type of memory including, for example, random access memory (RAM) of any type (e.g., DRAM, SRAM, DDRAM). In one embodiment, memory controller 420 may include trackers that may function as described above.

Figure 4B:
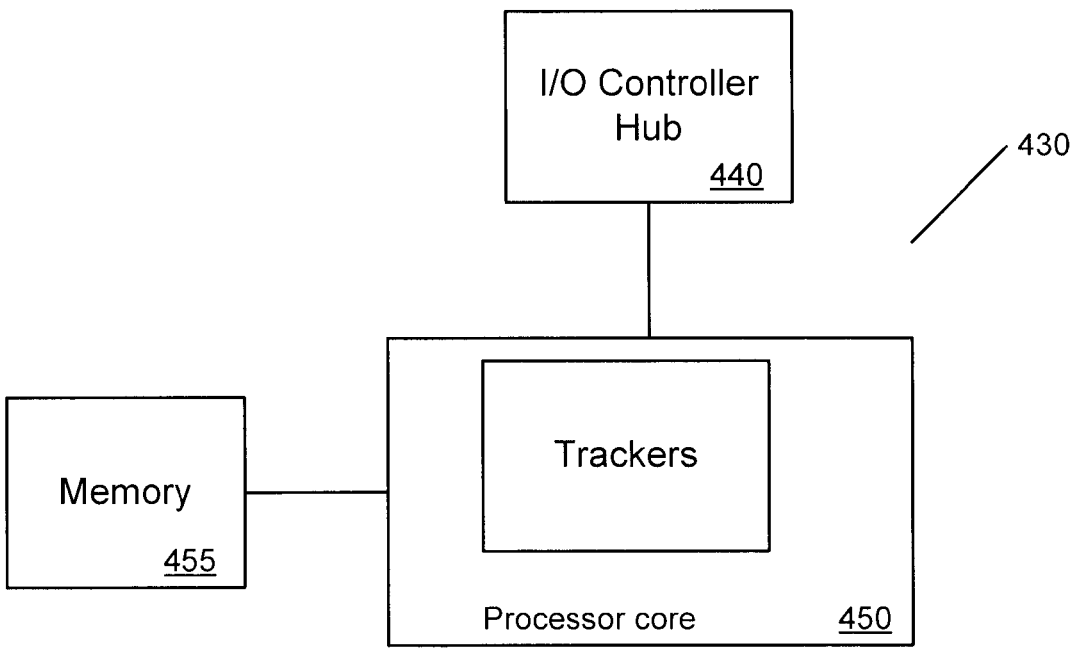
FIG. 4b is a block diagram of one embodiment of electronic system having a processor core, a memory and an I/O controller hub that may use a point-to-point interface in which one or more trackers may be used.

FIG. 4b is a block diagram of one embodiment of electronic system having a processor core, a memory and an I/O controller hub that may use a point-to-point interface in which one or more trackers may be used. Additional components not illustrated in FIG. 4a may also be supported.

Electronic system 430 may include processor core 450 and I/O controller hub 440 that are coupled together with a point-to-point interface as described above. Processor core 450 may also be coupled with memory 455, which may be any type of memory including, for example, random access memory (RAM) of any type (e.g., DRAM, SRAM, DDRAM). In one embodiment, processor core 450 may include trackers that may function as described above.

FIG. 4c is a block diagram of one embodiment of electronic system having an I/O controller hub coupled with two processor cores each having a memory that may use a point-to-point interface in which one or more trackers may be used. Additional components not illustrated in FIG. 4a may also be supported.

Electronic system 460 may include two processor cores 480, 490 and I/O controller hub 470 that are coupled together with point-to-point interfaces as described above. Processor cores 480, 490 may also be coupled with memories 485, 495, which may be any type of memory including, for example, random access memory (RAM) of any type (e.g., DRAM, SRAM, DDRAM). In one embodiment processor cores 480 and 490 may have trackers that function as described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a plurality of point-to-point interfaces to communicate with remote processing entities;
    a plurality of trackers configured to function as a plurality of queues to store non-snoop read and/or non-snoop write operations in order of reception and categorized by associated priority, the trackers to provide data coherency in a multi-node system including the remote processing entities, wherein the trackers are organized as a two-dimensional queue structure to resolve conflicts between conflicting read and write operations, the trackers to be utilized in processing both non-snoop and snoop operations; and
    a control circuit coupled with the plurality of trackers to cause the highest priority, non-conflicted non-snoop read/non-conflicted non-snoop write operation to be performed.

2. The apparatus of claim 1 wherein at least one of the remote processing entities comprises a processing core.

3. The apparatus of claim 1 wherein at least one of the remote processing entities comprises a memory controller.

4. The apparatus of claim 1 wherein one or more of the trackers comprise a register.

5. The apparatus of claim 1 wherein the plurality of queues comprise:
    a critical first in, first out (FIFO) queue;
    a priority FIFO queue;
    an ordered FIFO queue; and
    an unordered queue.

6. A system comprising:
    a dynamic random access memory (DRAM)
    a plurality of point-to-point interfaces to communicate with remote processing entities;
    a plurality of trackers configured to function as a plurality of queues to store non-snoop read and/or non-snoop write operations in order of reception and categorized by associated priority, the trackers to provide data coherency in a multi-node system including the remote processing entities, wherein the trackers are organized as a two-dimensional queue structure to resolve conflicts between conflicting read and write operations, the trackers to be utilized in processing both non-snoop and snoop operations; and
    a control circuit coupled with the plurality of trackers to cause the highest priority, non-conflicted non-snoop read/non-conflicted non-snoop write operation to be performed utilizing the DRAM.

7. The system of claim 6 wherein at least one of the remote processing entities comprises a processing core.

8. The system of claim 6 wherein at least one of the remote processing entities comprises a memory controller.

9. The system of claim 6 wherein one or more of the trackers comprise a register.

10. The system of claim 6 wherein the plurality of queues comprise:
    a critical first in, first out (FIFO) queue;
    a priority FIFO queue;
    an ordered FIFO queue; and
    an unordered queue.

11. A method comprising:
    maintaining a plurality of tracking structures organized as at least two or more queues to store posted non-snoop memory access operations, the two or more queues having associated priorities, the trackers to provide data coherency in a multi-node system, wherein the trackers are organized as a two-dimensional queue structure to resolve conflicts between conflicting read and write operations, the trackers to be utilized in processing both non-snoop and snoop operations;
    receiving a non-snoop memory access operation;
    determining whether a posted non-snoop memory access operation conflicts with the received non-snoop memory access operation; and
    halting processing of at least one higher priority queue in favor of a lower priority queue to resolve the conflict between the posted non-snoop memory access operation and the received non-snoop memory access operation.

12. The method of claim 11, wherein the two or more queues comprise:
    a critical first in, first out (FIFO) queue;
    a priority FIFO queue;

an ordered FIFO queue; and an unordered queue.

13. The method of claim 11 wherein the two or more queues comprise one or more general-purpose trackers.

14. The method of claim 13 wherein one or more of the trackers comprise a register.

15. The method of claim 13 wherein one or more of the trackers comprise a memory location.

16. An article comprising a computer-readable medium having stored thereon instructions that, when executed, cause one or more processors to:

maintain a plurality of tracking structures organized as at least two or more queues to store posted non-snoop memory access operations, the two or more queues having associated priorities, the trackers to provide data coherency in a multi-node system, wherein the trackers are organized as a two-dimensional queue structure to resolve conflicts between conflicting read and write operations, the trackers to be utilized in processing both non-snoop and snoop operations;

receive a non-snoop memory access operation;

determine whether a posted non-snoop memory access operation conflicts with the received non-snoop memory access operation; and halt processing of at least one higher priority queue in favor of a lower priority queue to resolve the conflict between the posted non-snoop memory access operation and the received non-snoop memory access operation.

17. The article of claim 16, wherein the two or more queues comprise:

a critical first in, first out (FIFO) queue;

a priority FIFO queue;

an ordered FIFO queue; and an unordered queue.

18. The article of claim 17 wherein the two or more queues comprise one or more general-purpose trackers.

19. The article of claim 18 wherein one or more of the trackers comprise a register.

* * * * *